United States Patent [19]

Evans

[11] Patent Number: 5,058,713

[45] Date of Patent: Oct. 22, 1991

[54] HYDRAULIC DRUM BRAKE ASSEMBLY

[75] Inventor: Anthony C. Evans, Northville, Mich.

[73] Assignee: Kelsey-Hayes Company, Romulus, Mich.

[21] Appl. No.: 657,877

[22] Filed: Feb. 19, 1991

Related U.S. Application Data

[63] Continuation of Ser. No. 386,913, Jul. 31, 1989, abandoned.

[51] Int. Cl.$^5$ .............................................. F16D 65/52
[52] U.S. Cl. ........................... 188/79.54; 188/79.56;
188/196 BA; 188/106 F; 188/328; 188/196 F;
188/79.64; 188/196 V
[58] Field of Search ............... 188/79.51, 79.54, 79.56,
188/79.63, 79.64, 196 V, 196 B, 196 BA, 196 F,
196 C, 196 R, 325, 106 F, 327, 328, 329, 106 A,
106 R

[56] References Cited

U.S. PATENT DOCUMENTS

| | | | |
|---|---|---|---|
| 3,016,990 | 1/1962 | Towns | 188/79.54 |
| 3,249,182 | 5/1966 | O'Reilly | 188/79.63 X |
| 3,874,481 | 4/1975 | Margetts | 188/79.56 |
| 3,991,861 | 11/1976 | Hayashida | 188/79.54 |
| 3,998,297 | 12/1976 | Aono | 188/79.54 |
| 4,015,693 | 4/1977 | Hayashida et al. | 188/79.54 |
| 4,061,210 | 12/1977 | Fasano | 188/79.54 |
| 4,492,289 | 1/1985 | Warnock | 188/79.63 |
| 4,589,527 | 5/1986 | Danne et al. | 188/79.54 |
| 4,782,923 | 11/1988 | Yamazaki | 188/196 B X |

FOREIGN PATENT DOCUMENTS

| | | |
|---|---|---|
| 2606925 | 9/1976 | Fed. Rep. of Germany . |
| 2530930 | 1/1977 | Fed. Rep. of Germany . |
| 2932340 | 3/1981 | Fed. Rep. of Germany ... 188/79.64 |
| 3311147 | 9/1984 | Fed. Rep. of Germany ... 188/79.64 |
| 2103738 | 2/1983 | United Kingdom ............ 188/79.64 |
| 2132291 | 7/1984 | United Kingdom . |

Primary Examiner—Douglas C. Butler
Attorney, Agent, or Firm—MacMillan, Sobanski & Todd

[57] ABSTRACT

In a hydraulic drum brake and parking brake assembly, when a hydraulic actuator is operated to engage an opposed pair of brake shoes with a brake drum after a predetermined amount of wear had occurred on the friction pads of the brake shoes, a torsion spring adjusts a cam in the parking brake portion of the mechanism to compensate for the wear. The parking brake will thus operate properly despite the wear.

11 Claims, 3 Drawing Sheets

HYDRAULIC DRUM BRAKE ASSEMBLY

CROSS-REFERENCE TO RELATED APPLICATIONS

This application is a continuation of U.S. patent Ser. No. 07/386,913, filed July 31, 1989, now abandoned.

BACKGROUND OF THE INVENTION

This invention generally relates to a hydraulic drum brake and parking brake assembly for an automotive vehicle, and more specifically to an automatic wear adjuster for adjusting the drum to friction pad clearance as the friction pad wears.

SUMMARY OF THE INVENTION

In accordance with the invention, as a predetermined amount of friction pad wear occurs, an adjustment of the parking brake mechanism is automatically made upon operation of the hydraulic brake. Therefore, the parking brake will always operate properly even though it may not have been used for a long time and wear of the friction pads has occurred.

The invention will be more readily understood when considered in conjunction with the accompanying drawings.

DETAILED DESCRIPTION OF THE INVENTION

Figure 1:
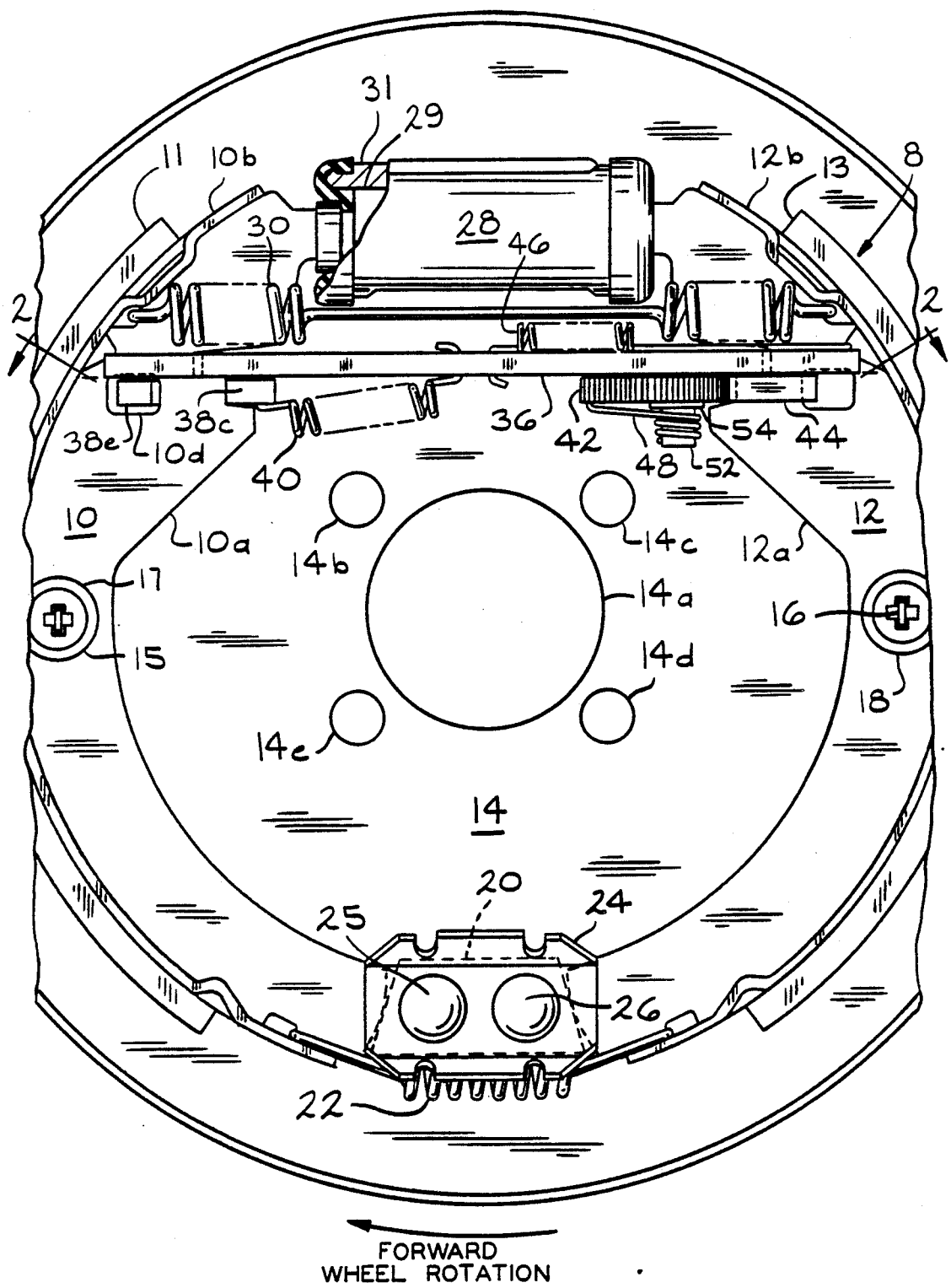
FIG. 1 is an outboard elevational view of a typical right rear leading-trailing hydraulic drum brake including a parking brake assembly constructed in accordance with the invention.
Figure 2:
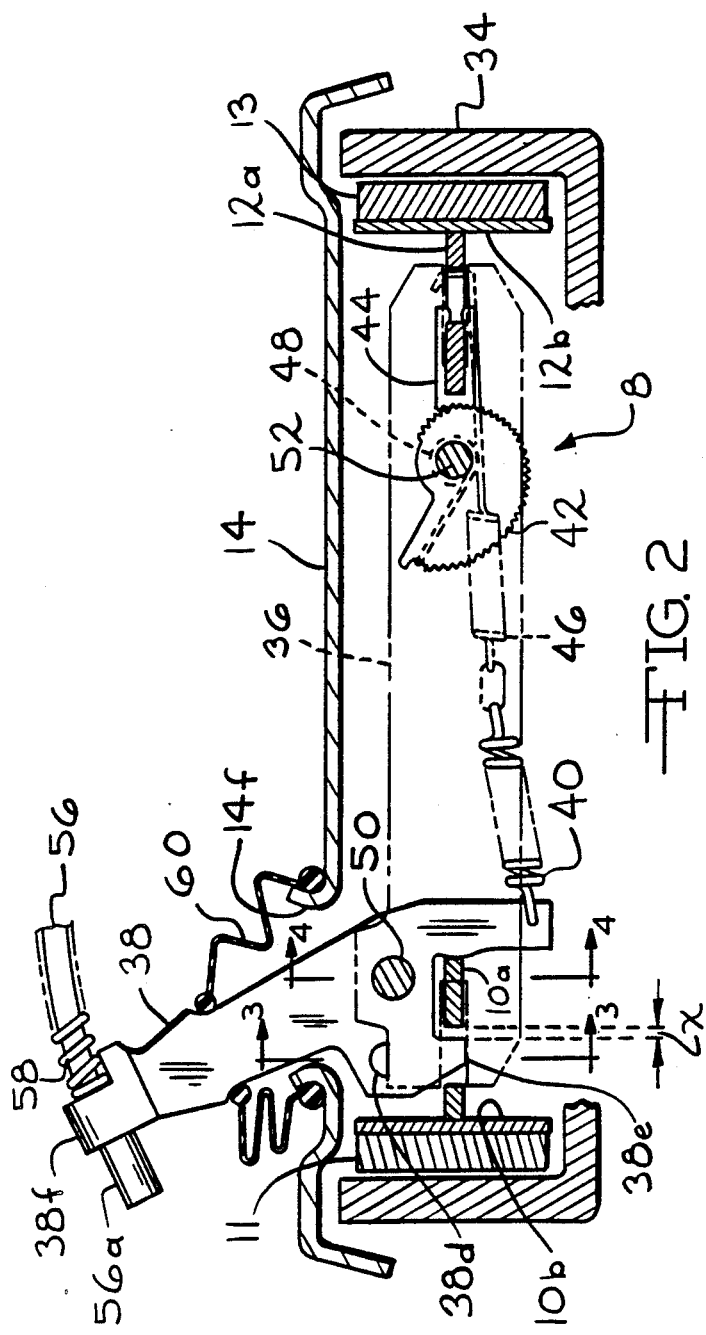
FIG. 2 is a sectional view generally taken along line 2—2 of FIG. 1, showing the connecting link between the opposite brake shoes in phantom and including peripheral portions of the brake drum in section.
Figure 4:
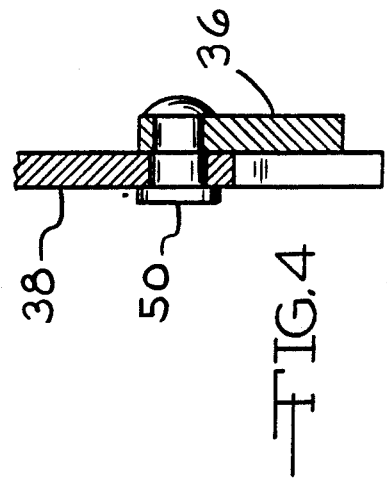
FIG. 4 is fragmentary sectional view generally taken along line 4—4 of FIG. 2.
Figure 3:
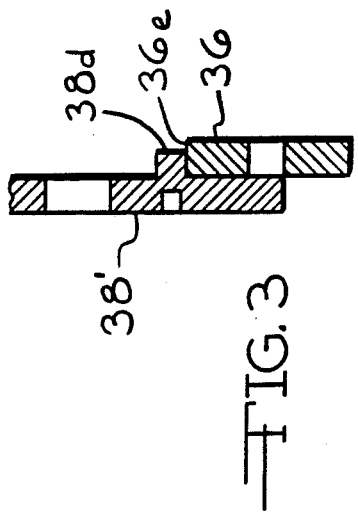
FIG. 3 is a fragmentary sectional view generally taken along line 3—3 of FIG. 2.

With reference to the drawings, FIGS. 1 and 2 show a typical automotive leading-trailing hydraulic drum brake including a manual parking brake assembly 8 for the right rear wheel of a motor vehicle, the assembly 8 being constructed in accordance with my invention. The drum brake includes a pair of conventional arcuate brake shoes 10 and 12 of generally T-shaped cross section including web portions 10a and 12a and table 10b and 12b. The brake shoes 10 and 12 are typically held against an inboard backing plate 14 respectively by a pair of tie rods 15 and 16 (FIG. 1) extending through backing plate 14, webs 10a and 12a of the respective brake shoes, and respectively engaging the slotted openings of spring loaded retaining members 17 and 18.

Backing plate 14 has a central aperture 14a for passing over the axle (not shown) and four bolt-receiving holes 14b, 14c, 14d, and 14e for attaching the backing plate to the frame (not shown) of a vehicle by threaded fasteners.

Adjacent their lower ends, web portions 10a and 12a of brake shoes 10 and 12 are held against an abutment 20 by tension spring 22 and retaining plate 24. Abutment 20 and retaining plate 24 are typically mounted on a raised boss portion (not shown) of the backing plate 14 by a pair of rivets 25 and 26. Tables 10b and 12b of brake shoes 10 and 12 are provided respectively with a pair of friction pads 11 and 13.

A typical double-acting hydraulic cylinder 28 is mounted on the backing plate 14 between the upper ends of the brake shoes 10 and 12 as shown in FIG. 1. A tension spring 30 holds the upper end portions of brake shoe webs 10a and 12a respectively against a pair of pistons 29 (only one being shown) of the brake cylinder 28. When hydraulic fluid is supplied to brake cylinder 28, as by operation of a vehicle brake pedal, pistons 29 move outwardly forcing the upper end portions of the brake shoes 10 and 11 apart and affect engagement of friction pads 11 and 13 with the inner cylindrical portion of brake drum 34 as shown in FIG. 2. Rotation of brake drum 34 when the vehicle is moving tends to rotate the brakes shoes 10 and 12 when the friction pads 11 and 13 are engaged therewith. However, abutment 20 and brake cylinder 28 prevent the brake shoes from rotating, in either direction. Braking torque is transmitted to the vehicle frame through abutment 20.

The friction pads 11 and 13 are also movable into engagement with the brake drum 34 by a manually operable parking brake mechanism, and in accordance with my invention, the parking brake mechanism is automatically adjusted upon a predetermined amount of wear of the friction pads 11 and 13, when the hydraulic cylinder 28 is actuated.

The parking brake includes a relatively flat operating link 36 shown in phantom in FIG. 2, an operating lever 38, a tension spring 40, a toothed cam 42, a load-carrying cam-positioning bearing 44, a tension spring 46 shown in phantom in FIG. 2, and a torsion spring 48. These parts are most clearly shown in the exploded view of FIG. 5.

Link 36 has a notch 36a at one end for loose cooperative engagement with web 10a at a notch 10c therein and a notch 36b at the opposite end for loose cooperative engagement with the web 12a at a notch 12c therein. Link 36 has a hole 36c and the lever 38 has a hole 38a for reception of a rivet 50 pivotally connecting link 36 and lever 38.

Spring 40 is hooked at one end in hole 36d of link 36 and at the opposite end in hole 38b of arm portion 38c adjacent an inner end of the lever 38 to normally bias lever 38 pivotally about the rivet 50 such that raised stop 38d of lever 38 engages link 36 at an edge surface portion 36e thereof.

Spring 46 is hooked at one end in hole 36d and at the opposite end in notch 12d of web 12a, thereby biasing link 36 toward web 12a. A pin 52 is mounted in hole 36f of link 36 and in a hole 42a in the toothed cam 42 to pivotally interconnect the link 36 and cam 42. Pin 52 extends through link 36 and is securely affixed thereto by any convenient means to prevent rotation relative to link 36. Cam 42 is rotatingly attached to pin 52 and held in place by snap ring 54. One end of the torsion spring 48 is held in slot 52c of pin 52 with the opposite end thereof received in notch 42b of cam 42.

Bearing 44 is generally U-shaped and includes a pair of opposed leg portions 44a and 44b and an outwardly toothed bight portion 44c. Free end portions of legs 44a and 44b have inwardly extending knob portions 44d and 44e received in hole 12e of web 12a. The inner side of bight portion 44c engages web portion 12a at edge portion 12g adjacent ledge 12f thereon and extending to notch 12c.

Projection 38e of lever 38 normally extends, with clearance, into hole 10d of web 10a, as best shown in FIGS. 1 and 2. Arm 38c normally engages web 10a, and the projection 38e is normally a defined distance x (FIG. 2) from the corresponding portion of the web 10a defining hole 10d.

Figure 5:
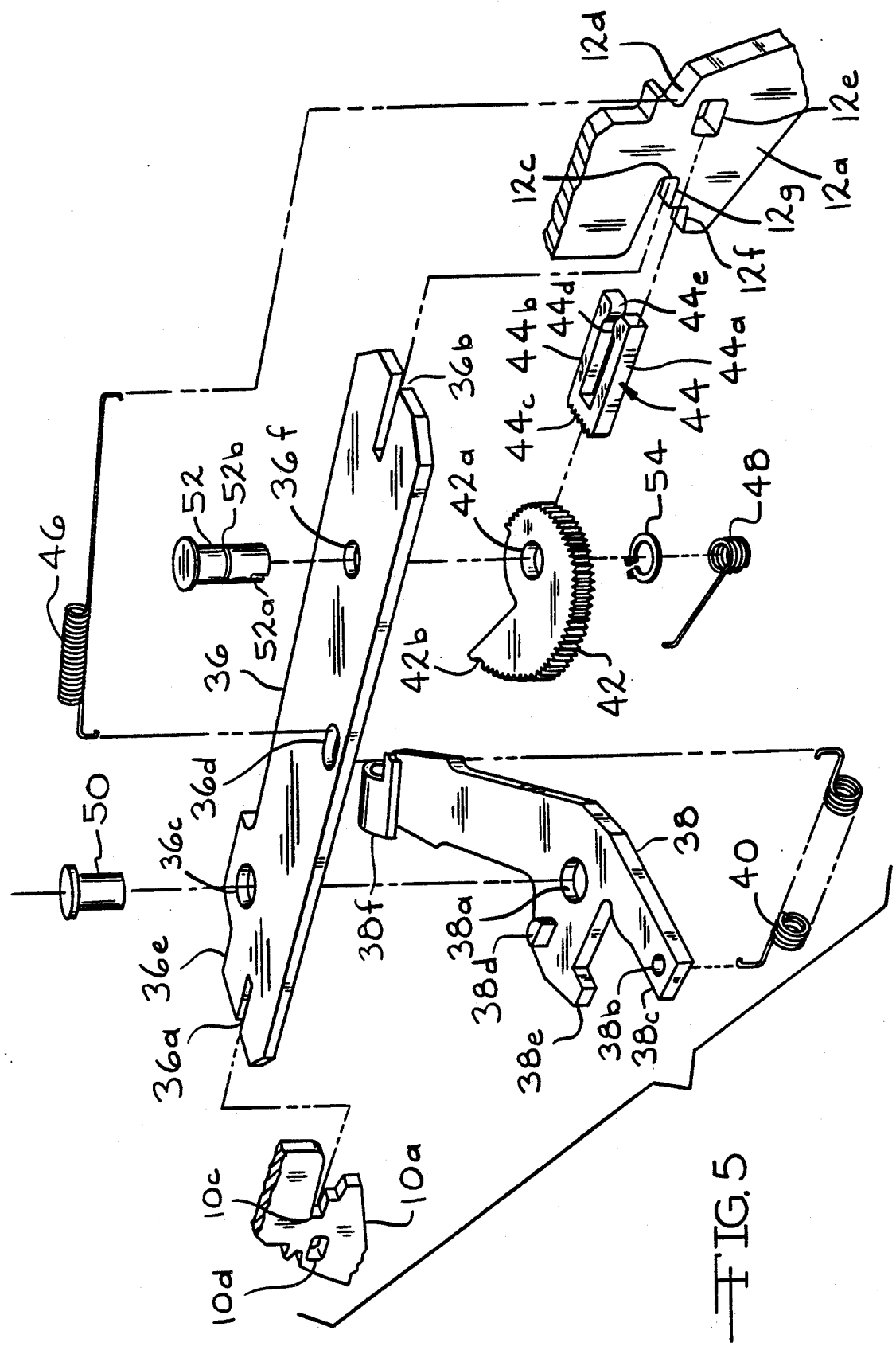
FIG. 5 is an exploded perspective view of the parking brake assembly.

The outer end portion 38f of the lever 38 is reversely curved, as best shown in FIG. 5, for reception of a cable 56 (FIG. 2) having an enlarged end 56a anchored in place by a spring 58 in a conventional manner. A rubber boot 60 seals opening 14f in backing plate 14 through which lever 38 extends. The opposite end of cable 56 is connected to a lever mechanism (not shown) manually operable by a driver of the vehicle.

OPERATION

Upon normal operation of the parking brake, the cable 56 will be moved to the right as viewed in FIG. 2, lever 38 will thus be pivoted clockwise about rivet 50 overcoming the force of the spring 40. Arm 38c will move web 10a to the left overcoming the force of spring 30, thereby moving friction pad 11 into engagement with the inner periphery of brake drum 34. Upon further pivotal movement of lever 38, the center of pivotal movement will shift to the point of contact of arm 38c with the web 10a and rivet 50 will translate to the right, moving link 36, pin 52, cam 42, bearing 44, and web 12a to the right, against the force of the spring 30, and thereby causing engagment of friction pad 13 with the inner periphery of brake drum 34.

Upon the release of the parking brake, spring 30 will return brake shoes 10 and 12 and friction pads 11 and 13 to the disengaged position with respect to the brake drum 34 and the spring 40 will return lever 38 to its normal disengaged position shown.

Upon normal operation of the hydraulic brake, the left piston 29 as shown in FIG. 1 will move the brake shoe 10 to the left, and the right piston (not shown) will move the brake shoe 12 to the right along with the bearing 44, cam 42, pin 52, link 36, rivet 50, and lever 38. The relative movement of the brake shoes 10 and 12 away from each other and the consequent engagement of the friction pads 11 and 13 with the brake drum 34 moves the projection 38e, relative to the web 10a, through a distance x shown in FIG. 2 designated as the friction pad "running clearance".

Spring 40 is stronger than spring 46, therefore, as the friction pads 11 and 13 become worn, additional movement of the brake shoes 10 and 12 apart from each other becomes necessary for engagement of the worn friction pads 11 and 13 with brake drum 34. This additional movement, after the projection 38e engages the corresponding edge of hole 10d in web 10a, is accompanied by stretching of spring 46. The stretching or elongation of the spring 46 beyond its normal length releases the pressure it normally exerts between the cam 42 and the bearing 44. The cam 42 is biased, counterclockwise as viewed in FIG. 2, by the torsion spring 48, thus when the pressure between cam 42 and bearing 44 is released, cam 42 will rotate to present a larger effective radius to bearing 44 thereby compensating for the wear of the friction pads 11 and 13. The cooperation between the teeth of cam 42 and the teeth of bearing 44 prevents rotation of the cam 42 except as required. The next time the parking brake is operated, the friction pads 11 and 13, though worn, will nevertheless firmly engage the brake drum 34, because of the compensation provided by the cam 42.

Various modifications may be made in the structure shown and described without departing from the scope of the invention as set forth in the following claims.

The invention is claimed as follows:

1. A hydraulically and mechanically actuated drum brake assembly for a rear wheel of an automotive vehicle, said assembly comprising a cylindrical brake drum, a pair of oppositely disposed brake shoes of generally T-shaped cross section mounted in the drum and each including a flat web forming a trunk of the T-shape and having an arcuate outer edge, an arcuate rim forming a head of the T-shape and being secured to the outer edge of the web, and an arcuate friction pad mounted on an outer surface of the rim and operatively engageable with an inner surface of the drum, a double-acting hydraulic actuator mounted in the drum and operatively connected adjacent opposite ends respectively to a pair of adjacent end portions of said webs, an elongate operating link mounted in the drum adjacent said actuator and disposed in loose cooperative engagement adjacent opposite ends respectively with said webs, an operating lever for mechanically actuating said brake assembly, said lever pivotally mounted on said link adjacent one end thereof, said operating lever having a stop engageable with an edge of said operating link, having an arm adjacent an inner end normally engaged with one of said webs, and having a projection adjacent said inner end normally extending with clearance into a hole in said one web, a cam pivotally mounted on said link adjacent an opposite end thereof and having a toothed cam surface, a bearing mounted on the other of said webs and having a toothed bearing surface normally in interlocking engagement with said toothed cam surface, a first tension spring operatively connected adjacent one end to said other web and adjacent an opposite end to said operating link and normally biasing said bearing into engagement with said cam, a torsion spring angularly biasing said cam in a radius-increasing direction with respect to said bearing, and a second tension spring operatively connected adjacent one end to said operating link and adjacent an opposite end to said arm of said operating lever and normally biasing said operating lever in an angular direction to engage said stop with said operating link, said second torsion spring being stronger than said first tension spring, whereby when said hydraulic cylinder is actuated after a predetermined amount of wear of said friction pads has occurred and said brake shoes are moved apart, said second tension spring maintains said stop on said operating lever in engagement with said operating link and maintains said projection of said operating lever in said hole in said one web, said projection engages said one web at an edge of said hole closer to said other web as a normal running clearance between said friction pads and said brake drum is taken up, and additional movement of said brake shoes apart from each other due to said predetermined amount of wear of said friction pads stretches said first tension spring and enables said torsion spring to adjust said cam to a larger radius with respect to said bearing.

2. In a hydraulically and mechanically actuated drum brake assembly including a cylindrical brake drum, a pair of oppositely disposed brake shoe assemblies each including a web having an arcuate outer edge, and an arcuate table secured to said outer edge of said web, and a friction pad affixed to the outer surface of said table and operatively engageable with the inner surface of said drum, and means for hydraulically actuating said brake assembly, the improvement comprising an operating link in loose cooperative engagement adjacent opposite ends respectively with said webs, an operating lever for mechanically actuating said brake assembly, said lever pivotally mounted on said link adjacent one end thereof in operative engagement with one of said webs, a cam pivotally mounted on said link adjacent the opposite end thereof and in operative engagement with the other of said webs, said cam being provided with a toothed adjusting surface having an increasing larger radii, a toothed bearing mounted on said other web for normal interlocking engagement with said toothed adjusting surface of said cam, a first tension spring operatively connected between said other web and said operating link for normally biasing said cam into operative into engagement with said bearing, said cam being automatically angularly adjusted as required, upon hydraulic actuation of said brake assembly, to present an incrementally larger radii to said other web thereby compensating for corresponding incremental amounts of wear of said friction pads.

3. The improvement as claimed in claim 2 including a torsion spring angularly biasing said cam in a direction wherein its radius presented to said other web is effectively increased.

4. The improvement as claimed in claim 3 wherein said operating lever is provided with a stop engageable with said link, with an arm adjacent an inner end normally engaged with said one web, and with a projection adjacent said inner end normally extending with clearance into a hole in said one web.

5. The improvement as claimed in claim 4, including a second tension spring operatively connected between said link and said operating lever for normally biasing said operating lever in an angular direction to engage said stop with said link, and said second tension spring being stronger than said first tension spring.

6. In a hydraulically and mechanically actuated drum brake assembly including a cylindrical brake drum, a pair of oppositely disposed brake shoe assemblies each including a web having an arcuate outer edge, and an arcuate table secured to said outer edge of said web, and a friction pad affixed to the outer surface of said table and operatively engageable with the inner surface of said drum, and means for hydraulically actuating said brake assembly, the improvement comprising an operating link extending between adjacent opposite ends of said webs, an operating lever for mechanically actuating said brake assembly, said lever pivotally mounted on said link adjacent one end thereof and in operative engagement with one of said webs, a first spring means connected between said lever and said link for biasing said lever toward a non-actuated position, an adjusting means mounted on said link adjacent the opposite end thereof and in operative engagement with the other of said webs, said adjusting means being provided with an adjusting surface which presents an increasing larger length to said other web as said adjusting means is moved, and a second spring means connected between said link and said other web for normally biasing said adjustment means into operative engagement with said other web, said adjusting means being automatically adjusted as required, upon hydraulic actuation of said brake assembly, to present an incrementally larger length to said other web thereby compensating for corresponding incremental amounts of wear of said friction pads.

7. The improvement as defined in claim 6 wherein said adjusting means is a cam having an adjusting surface of increasing radii, and including a torsion spring angularly biasing said cam in a direction wherein its radius presented to said other web is effectively increased.

8. The improvement as defined in claim 7 wherein said adjusting surface of said cam is toothed and a bearing is mounted on said other web, said bearing also being toothed for normal interlocking engagement with said cam.

9. The improvement as defined in claim 8 wherein said second spring means normally biases said bearing into engagement with said cam.

10. The improvement as defined in claim 6 wherein said operating lever is provided with a stop engageable with said link with an arm adjacent an inner end normally engaged with said one web, and with a projection adjacent said inner end normally extending with clearance into a hole in said one web.

11. The improvement as defined in claim 10 wherein said first spring means normally biases said operating lever in an angular direction to engage said stop with said link, and said first tension spring is stronger than said second tension spring.

* * * * *